United States Patent
Mewhinney et al.

[15] 3,670,407
[45] June 20, 1972

[54] METHOD OF REDUCING IRON LOSSES IN THE STATOR CORES OF ALTERNATING CURRENT MACHINES

[72] Inventors: Albert B. Mewhinney; Ellwood P. Herzog, both of Dayton, Ohio

[73] Assignee: General Motors Corporation, Detroit, Mich.

[22] Filed: March 9, 1970

[21] Appl. No.: 17,378

[52] U.S. Cl.................................................29/596, 29/609
[51] Int. Cl....................................H02k 15/02, H02k 15/12
[58] Field of Search....................29/596, 598, 609; 156/344, 156/584, 247

[56] References Cited

UNITED STATES PATENTS

| | | | |
|---|---|---|---|
| 3,421,208 | 1/1969 | Larsen et al. | 29/609 |
| 3,412,453 | 11/1968 | Larsen | 29/596 X |
| 3,533,867 | 10/1970 | Van Derzee | 29/596 |
| 3,421,209 | 1/1969 | Gibbs et al. | 29/609 |

Primary Examiner—Theron E. Condon
Assistant Examiner—Horace M. Culver
Attorney—Eugene W. Christen, Creighton R. Meland and Richard G. Stahr

[57] ABSTRACT

A method for reducing eddy current losses in the laminated stator cores of alternating current machines. The core is supported only on the tooth tips by the ledge portion of a support member of circular cross-section which engages only the tips of the teeth around the circumference of the bore at its termination at one end surface of the core. A single turn electrical coil is placed adjacent the opposite end surface of the core with the axis of the coil in the same direction as the axis of the core and a surge of electrical current is passed through the coil by discharging a capacitor or a bank of capacitors therethrough. The magnetic fields produced by the flow of current through the coil and the resulting induced currents flowing on the face of at least the end lamination of the stator core adjacent the coil interact to produce a circumferentially uniform, axial magnetic force which flexes the unsupported portion of the stator core in a direction away from the coil, thereby deflecting the laminations to produce a circumferentially uniform, radial slip-shear movement between adjacent laminations to interrupt any electrical circuits which may be present between adjacent laminations.

1 Claim, 6 Drawing Figures

INVENTORS
Albert B. Mewhinney, &
BY Ellwood P. Herzog

Richard G. Stahr
ATTORNEY

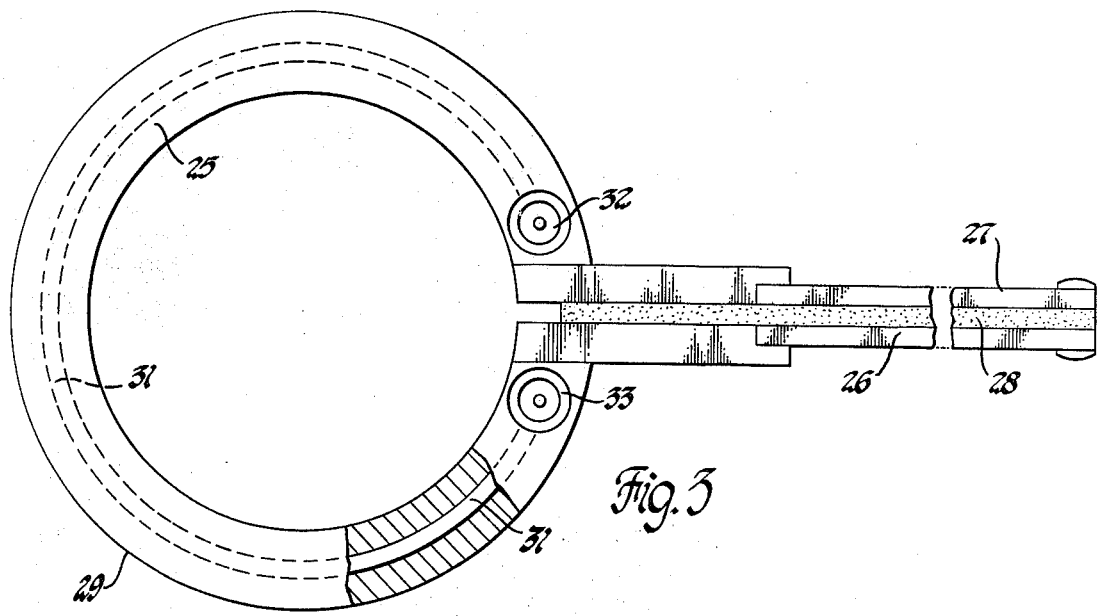
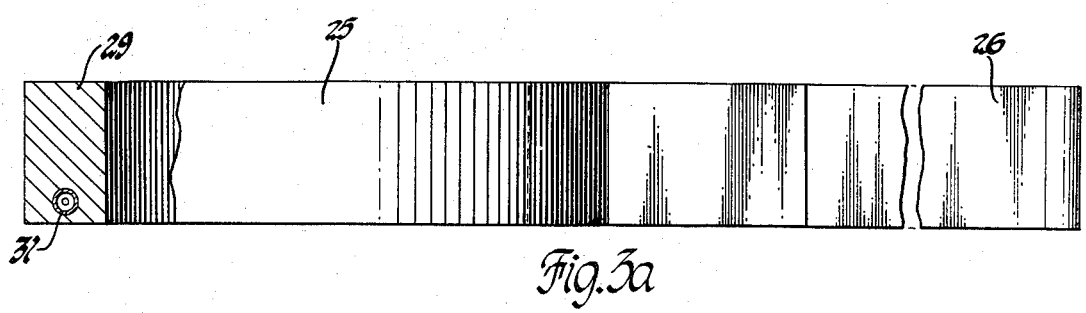
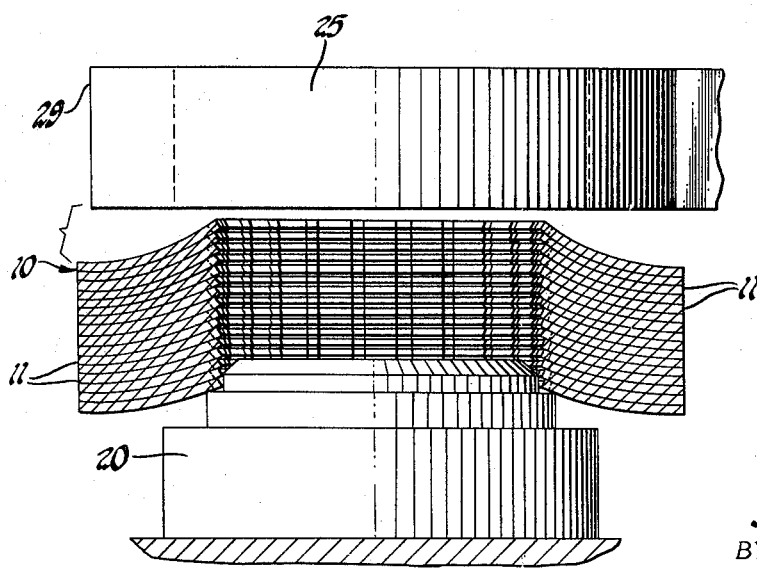

METHOD OF REDUCING IRON LOSSES IN THE STATOR CORES OF ALTERNATING CURRENT MACHINES

This invention is directed to a method for reducing iron losses in the laminated stator cores of alternating current machines and, more specifically, to a method for reducing these iron losses by a radial, slip-shear movement between adjacent laminations as a result of magnetic impact.

The stator cores of alternating current machines are usually made up of a number of relatively thin laminations of magnetic material which are stacked to a predetermined thickness and rigidly secured or maintained in the stacked relationship. The separate laminations are generally stamped from a strip or sheet of thin magnetic material such as electrical steel, each having a yoke portion extending about an axis and a plurality of inwardly extending integral tooth portions which terminate in a tooth tip. These laminations are stacked in register to the desired thickness with the teeth defining a plurality of coil receiving slots therebetween and the tooth tips defining a rotor receiving bore. The lamination stack is maintained in stacked relationship and in register by any one of several securing methods such as welding, keying, or riveting.

As each lamination is of a metallic material, each is electrically conductive. When placed in stacked relationship, small burrs of metal, which may be a result of the stamping operation, and/or conductive oxides produced during an annealing operation to relieve internal stresses and improve the magnetic properties of the core provide many parallel electrically conductive paths or circuits between adjacent laminations. These inter-lamination electrical circuits permit the flow of eddy currents between adjacent laminations which produce undesirable and sometimes intolerable iron losses or "core-losses."

To reduce iron losses in a laminated stator core, it is necessary that the inter-lamination electrical circuits be interrupted, thereby reducing or eliminating the flow of eddy currents between adjacent laminations.

Prior to applicants' novel method, these interlamination electrical circuits were interrupted by mechanical impact or blows such as produced by striking the cores together, by striking the cores with a hammer, or by dropping the cores on a hard surface. Also, some magnetic methods, not reliant on specific impact or radial, slip-shear action, have been proposed. Each of these techniques has disadvantages.

It is, therefore, an object of this invention to provide an improved method for reducing iron losses in the laminated stator cores of alternating current machines.

It is another object of this invention to provide an improved method for reducing iron losses in the laminated stator cores of alternating current machines which avoids the use of either physical blows or strictly magnetic forces.

In accordance with this invention, an improved method for reducing iron losses in the laminated stator cores of alternating current machines is provided which comprises the steps of supporting the core only on the tooth tips on a support member and flexing the unsupported portion of the core in an axial direction about the support member which provides a fulcrum for the tooth tips by a circumferentially uniform, axial force preferably produced by locating a single turn electrical coil adjacent the end surface of the core opposite the support member and passing a surge of electrical current through the coil whereby the resulting magnetic fields interact to create a force which flexes the radially outboard unsupported portion of the core in an axial direction and away from the coil to deflect each lamination and produce a circumferentially uniform, radial slip-shear movement between adjacent laminations to interrupt or break any small electrical circuits therebetween.

For a better understanding of the present invention, together with additional objects, advantages and features thereof, reference is made to the following description and accompanying drawings in which:

Fig. 3 is a top view of a single turn coil suitable for use in the practice of the method of this invention;

Fig. 3A is an elevation view of FIG. 3; and

FIG. 4 is an exaggerated view of a stack of laminations in a deflected position.

Figure 2:
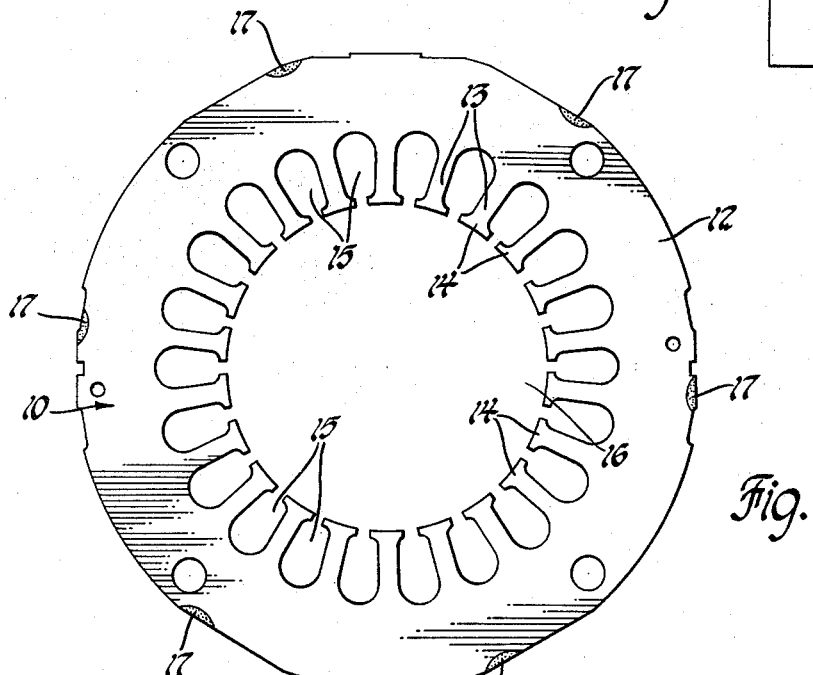
FIG. 2 is a top view of a typical alternating current motor stator core upon which the method of this invention may be practiced.
Figure 2A:
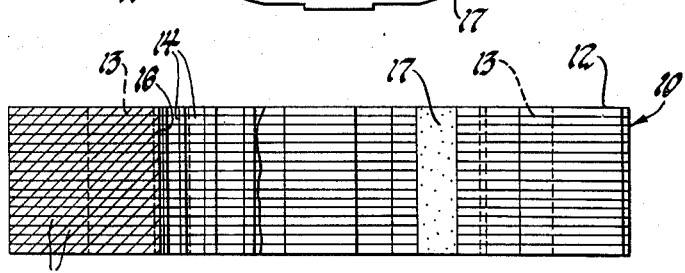
FIG. 2A is a front elevation view of FIG. 2.

Without intention or inference of a limitation thereto, the method of this invention will be described with reference to a typical alternating current motor stator core assembly as shown in FIGS. 2 and 2A and referenced by the numeral 10. The typical stator core is comprised of a plurality of metal core laminations 11, each having an outer yoke portion 12 extending about an axis and a plurality of inwardly extending integral tooth portions 13 each terminating in a tooth tip 14 at the inward end, stacked in register to a predetermined thickness with the teeth defining a plurality of coil receiving slots 15 therebetween and the tooth tips defining a rotor receiving bore 16 concentric with the axis of the yoke portion and terminating at opposite end surfaces of the lamination stack.

The laminations 11 are punched or stamped from a sheet or strip of magnetic material, such as electrical steel, of a thickness of the order of 0.025 inch. One example of a suitable electrical steel is composed of 0.02–0.03 percent carbon, 1.35 percent silicon, 0.35 percent aluminum and the remainder iron. The laminations are then stacked in a surface-to-surface relationship to a predetermined thickness and registered so that the tooth portions define the coil receiving slots therebetween and the tooth tips define the rotor receiving bore. To maintain the laminations in the stacked relationship and in register, a plurality of weld beads 17, each extending from end lamination to end lamination, may be run about the peripheral edge of the stack to provide a core assembly. It is to be specifically understood that other fastening or securing methods such as rivets or keys may be employed to maintain the laminations in stacked relationship and in register.

To relieve the stresses produced in the laminations during the punching or stamping operation, the core assembly may be placed in an annealing furnace for a total time of approximately 3½ hours, 1 hour of which is at a temperature of the order of 1,550° F. This anneal improves the magnetic properties of the core assembly by as much as a factor of three.

Core 10 is supported only on the tooth tips 14 by a support member 20 which engages only the tooth tips 14 surrounding the bore 16 at its termination at end surface 18 of the core. Support member 20 may have a circumferential ledge portion 21 of a width which will engage only the tips 14 of teeth 13, the tooth tips of the end lamination bearing substantially equally upon ledge portion 21 about the circumference thereof.

With core 10 thus supported, a circumferentially uniform, axial force is produced upon the unsupported portion of core 10 which flexes the unsupported portion of core 10 in an axial direction about support member 20 which provides a fulcrum for tooth tips 14 to produce a circumferentially uniform, radial slip-shear movement between adjacent laminations of core 10 which interrupts or breaks any electrical circuit paths between adjacent laminations.

Figure 1:
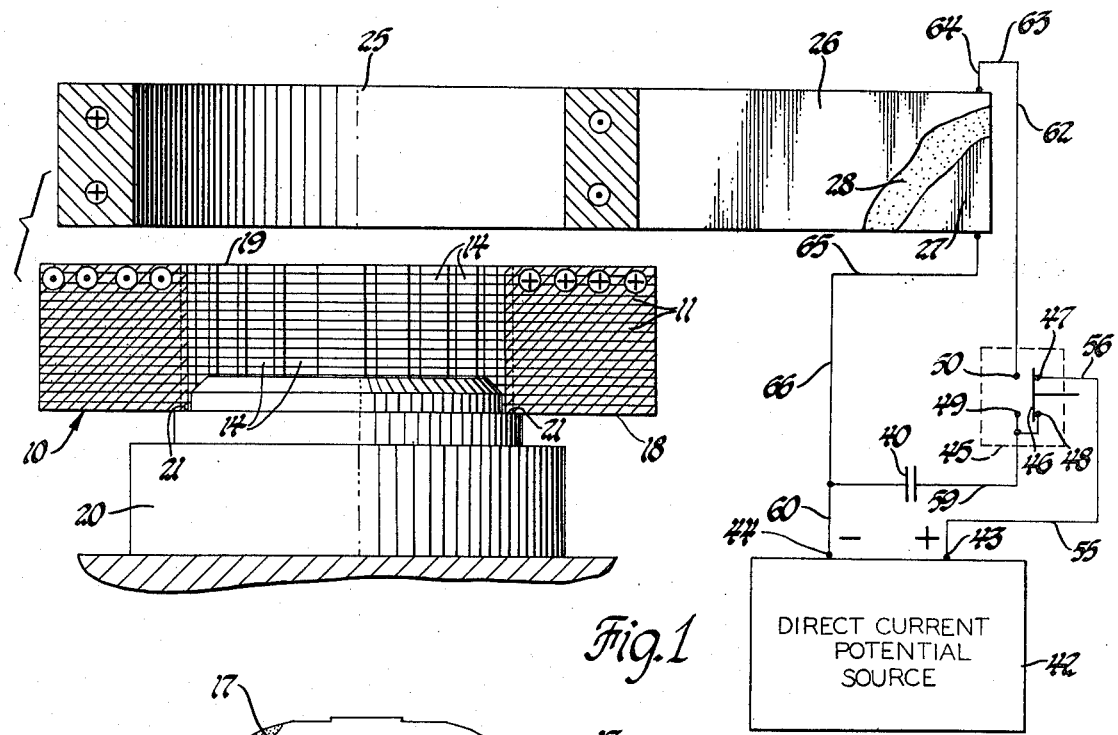
FIG. 1 is a representation, partially in cross-section, of the equipment used in the practice of the method of this invention.

One method of providing this circumferentially uniform axial force is to place a single turn electrical coil 25 adjacent the opposite end surface 19 of core 10 with the axis of coil 25 in the same direction as the axis of core 10, as best shown in FIG. 1, and passing at least one surge of electrical current through coil 25 in a manner to be later explained. Coil 25 is rigidly supported to prevent any movement thereof in an axial direction for reasons which will become apparent later in this specification.

One example of a single turn electrical coil suitable for use in the practice of the method of this invention is set forth in FIGS. 3 and 3A. Terminal portions 26 and 27 are provided for connecting the coil to external circuitry. Disposed between terminal portions 26 and 27 may be a sheet of electrical insulating material 28 such as a phenolic resin impregnated glass cloth or bakelized linen. One coil actually used in the practice of the method of this invention was made of steel with dimensions of 2½ inches along the vertical axis, as looking at FIG. 3A, and one-half inch thick through the horizontal axis of circumferential portion 29. To provide for water cooling the coil, a tube 31 may be embedded within circumferential portion 29. The ends of tube 31 may terminate at fittings 32 and 33 which are suitable for connection to an external source of water, not shown. It is to be specifically understood, however, that the coil as set forth in FIGS. 3 and 3A is exemplary only as other coil constructions and configurations may be employed in the practice of the method of this invention. It is to be specifically understood, however, that other methods may be employed to produce the circumferentially uniform axial force required to produce the circumferentially uniform, radial slip-shear movement between adjacent laminations.

One method of passing at least one surge of electrical current through coil 25 is to discharge a capacitor or a bank of capacitors through coil 25.

In FIG. 1, the capacitor referenced by the numeral 40 schematically represents a capacitor or a bank of capacitors as determined by the specific application. With the understanding that a bank of capacitors may be required for most applications, throughout this specification this element will be referred to as capacitance 40 in the interest of specification clarity. Capacitance 40 is charged to a high direct current potential, the magnitude of which is determined by the characteristics of core 10 as will be explained in detail in this specification in regard to specific cores upon which the method of this invention has been actually practiced.

Capacitance 40 may be charged from any one of a number of direct current potential sources well known in the art. Consequently, the potential source has been schematically represented in block form and referenced by the numeral 42 in FIG. 1. In the actual practice of the method of this invention, a 36 kilojoule unit including a direct current potential source capable of charging a bank of 18, 60-microfarad capacitors to selected direct current potential magnitudes up to a maximum of 8.3 kilovolts, was employed. The direct current potential source and capacitors are commercially available as a unit from Maxwell Laboratories, San Diego, California.

With movable contact 46 of electric switch 45 in electrical contact with normally closed stationary contacts 47 and 48, capacitance 40 receives a direct current potential charge from source 42 through a charging circuit which may be traced from terminal 43 of direct current potential source 42 through leads 55 and 56, stationary contact 47 of electric switch 45, movable contact 46, stationary contact 48, lead 59, capacitance 40 and lead 60 to terminal 44 of direct current potential source 42. A control arrangement, not shown, included with the commercially available power supply employed in the practice of the method of this invention permitted capacitance 40 to be charged to a selected direct current potential magnitude up to 8.3 kilovolts.

Upon the closure of movable contact 46 of electric switch 45 into electrical contact with stationary contacts 49 and 50, capacitance 40 discharges through coil 25 through a discharge circuit which may be traced from capacitance 40, through lead 59, stationary contact 49 of electric switch 45, movable contact 46, stationary contact 50, leads 62, 63 and 64 to terminal 26 of coil 25, through coil 25 to terminal 27 and leads 65 and 66 to the other plate of capacitance 40. Discharging capacitance 40 produces the necessary surge of electrical current through coil 25.

The switching device has been shown in FIG. 1 as a push-button type electrical switch 45. Alternate switching devices, such as solid state devices or mercury arc switches, and switching arrangements may also be employed.

As is well known, the flow of electrical current through an electrical conductor produces a concentric magnetic field about the conductor which increases with increases of current flow.

The concentric magnetic field about coil 25 which is produced by the surge of electrical current flow therethrough upon the discharge of capacitance 40 increases as the surge of current flow increases to induce a potential in at least the end lamination of core 10 adjacent coil 25 which acts as a short-circuited secondary winding of a transformer. It is well known that an induced potential is of a polarity or direction opposite that of the inducing potential, the charge upon capacitance 40. Therefore, the induced potential produces a flow of electrical current in at least the end lamination or laminations adjacent coil 25 in a direction, through the yoke portion, opposite to the flow of electrical current through coil 25 which is produced by discharging capacitance 40. The directions of current flow in both coil 25 and core 10 are schematically illustrated in FIG. 1 by the conventional symbols $\oplus$ and $\odot$, the former indicating a current flow in a direction away from the observer, the latter indicating a current flow in a direction toward the observer.

It is also well known that the magnetic fields produced by electrical currents passing in opposite directions through parallel electrical conductors produce respective concentric magnetic fields which interact to produce a magnetic force which tends to separate the conductors, that is, to force the conductors apart. The yoke portion 12 of core 10 and coil 25 are, of course, parallel conductors having electrical currents passing therethrough in opposite directions.

Therefore, the concentric magnetic fields produced by these respective currents in each core 10 and coil 25 interact with each other to produce a circumferentially uniform, axial magnetic force which tends to force the coil and core axially apart. As coil 25 is rigidly supported to prevent axial movement thereof, this force flexes or deflects the unsupported portion of core 10 in an axial direction away from coil 25 about support member 20 which provides a fulcrum for tooth tips 14 to produce a circumferentially uniform, radial, slip-shear movement between adjacent laminations of core 10 which interrupts or breaks any electrical circuit paths between adjacent laminations. This action may be more clearly understood from FIG. 4 which is an exaggerated view of a stack of laminations in the deflected position. From this drawing it may be seen that each lamination moves radially relative to each adjacent lamination in a slip-shear movement.

The magnitude of the axial force, hence energy, necessary to realize the desired results is dependent upon a variety of variables such as the precise construction of core 10, the material and thickness of its laminations, the thickness of the stack and the number of interlaminate bonds.

However, it is necessary that the force be less than that which will deflect the yoke portion of core 10 beyond the elastic limit of the material of the laminations. Should the yoke portion of the core be deflected beyond the elastic limit of the material of the laminations, the core would be permanently "set" in the direction of the deflection, consequently, the core would be unacceptable and discarded.

The magnitude of the energy discharged through coil 25 may be selected by adjusting the magnitude of the direct current charge upon capacitance 40 or by adjusting the value of the capacity of capacitance 40 or by adjusting both. With the power supply unit employed in the actual practice of the method of this invention, the magnitude of the direct current charge upon capacitance 40 was the more readily adjustable.

The foregoing discussion is based on the use of a coil 25 and current flow therethrough to achieve the required axial force. The flow of current through the coil, as the foregoing description indicates, produces this force through the resulting magnetic fields. This method of producing the axial force is considered to be preferred to mechanical techniques which alternatively may be used.

Set forth below are the typical results which are realized by the practice of the method of this invention upon three typical stator cores as follows:

|  | Core A | Core B | Core C |
| --- | --- | --- | --- |
| Outside diameter | 6.290" | 6.290" | 6.290" |
| Bore diameter | 3.187" | 3.187" | 3.187" |
| Number of Slots | 24 | 24 | 24 |
| Lamination thickness | .025" | .025" | .025" |
| Axial stack thickness | 3¼" | 3¾" | 3" |

The cores were annealed as hereinabove set forth in this specification and the iron loss of each was measured.

To measure the iron loss of a stator core, two torroidal coils are passed through the bore and around the yoke portion of the core. The first coil is connected to a source of alternating current energizing potential through the primary winding of a current transformer, the other coil is connected to the potential coil of a wattmeter and the secondary winding of the current transformer is connected to the current coil of the same wattmeter. Upon the passing of an alternating current through the first coil, a magnetic flux is produced in the core which induces a potential in the second coil to provide a wattmeter reading indicative of the iron loss in the stator core under test. Each core is tested at the same flux density, for example, 10,000 Gauss. Consequently, the magnitude of the alternating current energizing potential is determined by the area of the cross-section of the yoke portion of the core under test.

As measured by this technique, core A had an iron loss of 82 watts at 21.1 volts, core B had an iron loss of 140 watts at 24.4 volts, and core C had an iron loss of 118 watts at 19.7 volts.

A bank of capacitors of 1,080 microfarads was successively charged to direct current potential levels of 5,300 volts, 6,125 volts and 7,350 volts to provide energy levels of 15.2 kilojoules, 20.2 kilojoules and 29.2 kilojoules, respectively, to generate axial forces of varying, but controlled, magnitudes.

With each core supported only on the tooth tips on a support member and the single turn coil placed adjacent the opposite surface of the core as shown in FIG. 1, the capacitor bank was discharged through the coil at each direct current potential level and the iron loss of the core was measured after each current surge.

The iron loss of core A measured 22.9 watts after the 15.2 kilojoule energy surge of current, 19.9 watts after the 20.2 kilojoule energy surge and 17.7 watts after the 29.2 kilojoule energy surge. This is a reduction of 59.1 watts, 3 watts, and 2.2 watts, respectively.

The iron loss of core B measured 56.0 watts after the 15.2 kilojoule energy surge of current, 37.8 watts after the 20.2 kilojoule energy surge and 27.2 watts after the 29.2 kilojoule energy surge. This is a reduction of 84 watts, 18.8 watts, and 10.6 watts, respectively.

The iron loss of core C measured 52 watts after the 15.2 kilojoule energy surge of current, 24 watts after the 20.2 kilojoule energy surge and 16.3 watts after the 29.2 kilojoule energy surge. This is a reduction of 66 watts, 28 watts, and 7.7 watts, respectively.

In practicing the method of this invention on a production basis, it is most desirable to reduce the iron losses of each core to an acceptable level with only a single surge of current through the coil. Consequently, when the characteristics of cores of a particular type are determined, the capacitor or capacitors may be charged initially to the direct current potential level which will provide an energy level of sufficient magnitude to reduce the iron loss of each to an acceptable value with only one surge of current through the coil without permanently deflecting or damaging the core.

While a preferred embodiment of the present invention has been shown and described in this specification, it will be obvious to those skilled in the art that various modifications and substitutions may be made without departing from the spirit of the invention which is to be limited only within the scope of the appended claims.

WHAT IS CLAIMED IS:

1. A method for reducing iron losses in the stator cores of alternating current machines comprised of a plurality of metal laminations, each having an outer yoke portion extending about an axis and a plurality of inwardly extending integral tooth portions each terminating in a tooth tip at the inward end, stacked in register to a predetermined thickness with the teeth defining a plurality of coil receiving slots therebetween and the tooth tips defining a rotor receiving bore concentric with the axis of said yoke portions and terminating at opposite end surfaces of the lamination stack comprising the steps of supporting said core only on said tooth tips by a support member which engages only said tooth tips surrounding said bore at its termination at one end surface of said core, placing a single turn electrical coil in opposed adjacent relation to the opposite end surface of said core with the axis of said coil in the same direction as the axis of said core and passing at least one surge of electrical current through said coil whereby the magnetic fields produced by the surge of current through said coil and the current produced in at least the end lamination of said core adjacent said coil by the induced potential interact to produce a circumferentially uniform axial magnetic force upon the unsupported portion of said core which flexes said unsupported portion of said core in an axial direction away from said coil about said support member which provides a fulcrum for said tooth tips to produce a circumferentially uniform, radial, slip-shear movement between adjacent laminations of said core which interrupts any electrical circuit paths between adjacent laminations.

* * * * *